J. P. HAISLIP.
CHURN DASHER.
APPLICATION FILED MAR. 28, 1910.
968,937.
Patented Aug. 30, 1910.
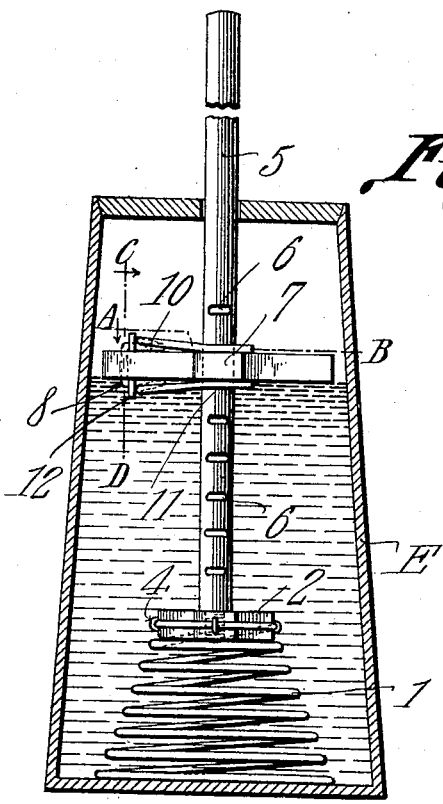
Fig. 1.
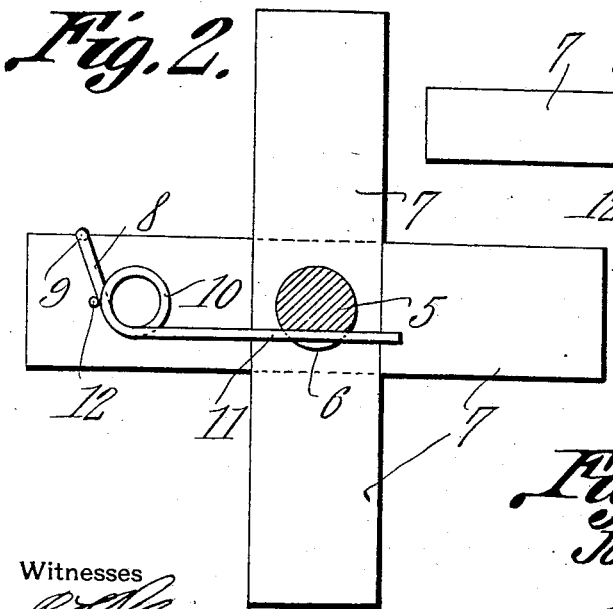
Fig. 2.
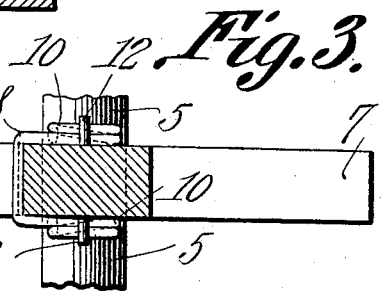
Fig. 3.
Fig. 4.
Witnesses
John P. Haislip
Inventor
by C. A. Snow & Co.
Attorneys

UNITED STATES PATENT OFFICE.

JOHN P. HAISLIP, OF ROANOKE, VIRGINIA, ASSIGNOR OF ONE-HALF TO JOEL T. PETERS, OF ROANOKE, VIRGINIA.

CHURN-DASHER.

968,937.          Specification of Letters Patent.      Patented Aug. 30, 1910.

Application filed March 28, 1910. Serial No. 552,025.

*To all whom it may concern:*

Be it known that I, JOHN P. HAISLIP, a citizen of the United States, residing at Roanoke, in the county of Roanoke and State of Virginia, have invented a new and useful Churn-Dasher, of which the following is a specification.

This invention relates to churn dashers and its object is to provide a device of this character having a spring for yieldingly supporting it in a normally predetermined position, the said dasher being adjustably mounted upon its staff so as to be brought into position upon the surface of the cream contained within the churn prior to the depression of the dasher.

Churns such as heretofore employed and which utilize dashers adapted to be reciprocated have been found objectionable because when the surface of the cream is located below the dasher there is considerable lost motion or, in other words, the dasher does not operate to agitate the cream during that portion of the stroke prior to its passing below the surface of the cream.

One of the objects of the present invention is to provide efficient means whereby the dasher can be readily adjusted to normally lie in the same level with the surface of the cream and thus permit any amount of cream to be placed within the churn without however getting the objectionable lost motion referred to.

With these and other objects in view the invention consists in certain novel details of construction and combinations of parts hereinafter more fully described and pointed out in the claims.

In the accompanying drawings the preferred form of the invention has been shown.

In said drawings, Figure 1 is a vertical section through a churn having a dasher therein constructed in accordance with the present invention. Fig. 2 is an enlarged section on line A—B Fig. 1. Fig. 3 is an enlarged section on the line C—D Fig. 1. Fig. 4 is a view partly in section and partly in elevation and showing the connection between the supporting spring and the base of the dasher staff or rod.

Referring to the figures by characters of reference E designates a churn of the usual or any preferred construction and the bottom thereof is adapted to support a spiral spring 1, the upper whirl of which extends around interengaging cross strips 2 having grooves 3 in the ends thereof and in which said upper whirl is seated, there being staples 4 or the like which are driven into the ends of the strips 2 and serve to hold the spring seated within the grooves. The said strips 2 are secured to the lower or inner end of the staff 5 of the dasher, said staff being provided with transverse grooves or incisions 6 and being extended through the intersecting portions of cross strips 7 constituting the dasher. These strips are disposed with their upper and lower faces flush and a U-shaped spring 8 straddles one edge of one of the strips and is seated within a groove 9 formed in said edge. The upper and lower portions of this spring merge into coils 10 from which extend spring fingers 11 located upon the upper and lower faces of the dasher. The notches or incisions 6 are spaced apart a distance equal to the thickness of the dasher and it will be apparent therefore that when the said dasher is brought to position between two of these notches, the fingers 11 can be caused to seat within the adjoining notches so as to lock the dasher against sliding movement upon the staff 5. Retaining pins 12 may be driven into the dasher close to the coils 10 so as to prevent the spring from swinging outwardly away from the staff and thus becoming loose.

In using the dasher which has been described, the same is inserted into the churn body E with the spring 1 bearing upon the bottom of the churn. After the cream has been placed in the churn the dasher is adjusted along the staff 5 until it is brought to the surface of the cream whereupon the fingers 11 are permitted to spring into the adjoining notches 6 and will thus lock the dasher to the staff. By then reciprocating the staff and dasher the cream will be churned in the usual manner and there will be no lost motion, inasmuch as the dasher works at all times within the cream.

Importance is attached to the particular connection between the spring and the lower end of the staff inasmuch as it is very simple and does not permit the parts to become readily disconnected.

Various changes can of course be made in the construction and arrangement of the parts without departing from the spirit or sacrificing any of the advantages of the invention as defined in the appended claims.

What is claimed is:—

1. A device of the class described including a staff, a dasher slidably mounted thereon, a spring embracing the dasher and having locking fingers upon opposite faces of the dasher adapted to engage the staff to hold the dasher against movement on the staff.

2. A device of the class described including a staff, said staff having notches therein, a dasher slidably mounted upon the staff, a spring embracing said dasher and having locking fingers adapted to be seated within the notches to hold said dasher against movement on the staff, and means for holding the spring against displacement relative to the dasher.

3. A device of the class described including a staff, a base, a spring extending beyond the base and having its upper whirl extending around and secured to said base, there being grooves within the base for the reception of said whirl, and a dasher adjustably mounted on the staff.

4. A device of the class described including a staff, crossed interlocking members secured to one end thereof and constituting a base, said members having grooves in the ends thereof, a supporting spring having one whirl seated within the grooves and secured therein, and a dasher adjustably mounted upon the staff.

In testimony that I claim the foregoing as my own, I have hereto affixed my signature in the presence of two witnesses.

JOHN P. HAISLIP

Witnesses:
  E. V. CHINN,
  J. M. SNOOT.